US011431768B2

(12) United States Patent
Delaney et al.

(10) Patent No.: US 11,431,768 B2
(45) Date of Patent: Aug. 30, 2022

(54) METHOD AND DEVICE FOR CONTROLLING CONTENT DURING A VIRTUAL MEETING

(71) Applicant: Lenovo (Singapore) Pte. Ltd., New Tech Park (SG)

(72) Inventors: Mark Patrick Delaney, Raleigh, NC (US); John Carl Mese, Cary, NC (US); Russell Speight VanBlon, Raleigh, NC (US); Nathan J. Peterson, Oxford, NC (US); Arnold S. Weksler, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 0 days.

(21) Appl. No.: 17/132,658

(22) Filed: Dec. 23, 2020

(65) Prior Publication Data

US 2022/0201050 A1 Jun. 23, 2022

(51) Int. Cl.
*H04L 65/401* (2022.01)
*H04L 65/4053* (2022.01)
(Continued)

(52) U.S. Cl.
CPC ...... *H04L 65/4015* (2013.01); *H04L 65/1089* (2013.01); *H04L 65/4053* (2013.01); *H04L 65/762* (2022.05)

(58) Field of Classification Search
CPC ............. H04L 65/4015; H04L 65/1089; H04L 65/4053; H04L 65/602
See application file for complete search history.

(56) References Cited

U.S. PATENT DOCUMENTS

| 7,031,954 B1 * | 4/2006 | Kirsch | G06F 21/6227 |
| | | | 707/731 |
| 7,305,472 B2 * | 12/2007 | Mighdoll | G06F 16/9577 |
| | | | 709/226 |

(Continued)

OTHER PUBLICATIONS

Ziegler et al., "Second Screen for HbbTV—Automatic application lauch and app-toapp communication enabling novel TV programme related second-screen scenarios", IEEE Third Internaltional Conference on Consumer Electronics, Dec. 2013.*

(Continued)

*Primary Examiner* — Todd L Barker
(74) *Attorney, Agent, or Firm* — The Small Patent Law Group LLC; Dean D. Small

(57) ABSTRACT

An electronic device is provided that includes a first display configured to display a primary resource, and a second display electronically coupled to the first display. The electronic device also includes a processor, and a data storage device having executable instructions accessible by the processor. Responsive to execution of the instructions, the processor shares the first display, including the primary resource, with at least one network based electronic device, and obtains context data related to a user of the at least one network based electronic device. Also responsive to the instructions, the processor selects between the first display and the second display to launch a network responsive resource based on the context data related to the user of the at least one network based electronic device while sharing the first display with the at least one network based electronic device.

20 Claims, 5 Drawing Sheets

(51) Int. Cl.
  *H04L 65/1089* (2022.01)
  *H04L 65/75* (2022.01)

(56) References Cited

U.S. PATENT DOCUMENTS

| | | | |
|---|---|---|---|
| 10,586,216 B2* | 3/2020 | Miller | G06Q 50/01 |
| 2009/0251457 A1* | 10/2009 | Walker | G06Q 10/00 |
| | | | 345/418 |
| 2011/0080348 A1* | 4/2011 | Lin | G06F 1/1626 |
| | | | 345/173 |
| 2012/0032783 A1* | 2/2012 | Ahn | G06F 3/1423 |
| | | | 340/6.1 |
| 2013/0344917 A1* | 12/2013 | Sobti | G06F 1/1632 |
| | | | 455/557 |
| 2015/0262132 A1* | 9/2015 | Miller | G06Q 10/109 |
| | | | 705/7.15 |
| 2017/0195129 A1* | 7/2017 | Peterson | H04W 4/50 |

OTHER PUBLICATIONS

Thommes et al., "Remote UI: A high-peformance remote user interface system for mobile consumer electronic devices", IEEE Trasactions on Consumer Electronics , Sep. 2012.*

Desruelle et al., "Leveraging the Ubiquitious web as a secure context-waware platform for adaptive applications", 2012.*

\* cited by examiner

METHOD AND DEVICE FOR CONTROLLING CONTENT DURING A VIRTUAL MEETING

BACKGROUND

Embodiments herein generally relate to methods and devices for controlling content during a virtual meeting.

Virtual meetings have become prevalent in society. With Covid-19 causing isolation, and businesses to shut down centrally located buildings, working from home, and conducting meetings over a meeting application have become common. Meeting applications such as Zoom, Webex, gotoMeeting, Google Meets, etc. have provided platforms where an individual can provide a common shared link to a group of individuals along with a meeting password, code, or both. At the time of the meeting, when the meeting presenter starts the meeting everyone is audibly connected through the link or call in number for discussion. Optionally, during such meetings, webcams can be utilized to see the presenter or individuals in the meeting. Text chats can also be provided for additional text questions.

One common feature of a virtual meetings is shared screen functionality. Typically, an activation button is provided on a display for the presenter, and once actuated, everyone in the meeting can see the display of the presenter. Once the presenter is finished with a document, webpage, presentation, etc., the presenter can stop sharing their display and the display of the presenter can no longer be observed by the other members that are part of the meeting. At this time, other members of the meeting optionally can share their displays instead. Such virtual meetings have allowed businesses to continue conducting meetings and operating as though all workers in the meeting are actually in a common office building instead of at numerous remote locations.

Another advancement in office equipment is the use of multiple displays for a computing device. In particular, a computing device such as a laptop computer, central processing unit (CPU), or the like can be electrically coupled to one or more monitors wirelessly, through a USB cord, etc. Once coupled, contents such as documents, webpages, applications, etc. can be moved from a computing device display to the monitor. In some instances, the monitor provides a larger display to facilitate viewing. Alternatively, a first document may be placed on the monitor, while a second document can be created and worked on by a user on the second display. This stops the need to have a physical print out of a document to read, reducing the amount of paper required to work. Optionally, third, fourth, etc. displays may similarly be utilized.

When an individual shares their display during a virtual meeting and has more than one display, often at the beginning of the screen sharing session the user is prompted to identify the display to share with other members in the meeting. At that point, the presenter can choose a first display that has content related to the meeting, while keeping other content on the second display that is not shared with others on the call. In this manner, an individual presenting may still take notes, work on other projects, not have to close projects, email etc. on the other display if they are not presenting.

Unfortunately, from time to time, an individual can accidently share their second display with coworkers, or launch an application not intended for an audience on a presenting display. Specifically, when a user is sharing a display or sharing an application, the user can open a link or program to a shared window or shared program. Sometimes this could be on purpose, other times this could be unintentional and cause poor user experience or perception of the person sharing. In particular, today, a window or application opens based on where other forms of that application are running. Therefore, if chrome is being used on a display, a new URL automatically launches on that display. Alternatively, the URL may automatically launch on the display being shared.

Depending on the material presented on in the URL, this can be problematic for the presenter. For example, an individual may be having a meeting with someone that is not part of their company or law firm, and the presenter may have confidential information on their second display leading to unintentional disclosure of confidential information. In addition, on occasion, a presenter may find themselves uninterested in the portion of the meeting that is occurring. As a result, the presenter may choose to launch an electronic mail (email) application or webpage not related to the ongoing meeting. However, the user may not realize which display the application is launching. As a result, the email, or non-meeting related website such as espn.com, cnn.com, foxnews.com, yahoofantasysports.com, etc. webpage may launch on the display being shared by the presenter during the middle of the meeting. Such inadvertent sharing can lead to annoyed bosses, clients, etc. and can be considered as unprofessional behavior. Similarly, an individual may desire to look at photographs of a non-work related events such as a friend's birthday party, a night out, etc. that may not be considered appropriate and unprofessional in a work setting that can similarly be accidently shared during the meeting.

SUMMARY

In accordance with embodiments herein, an electronic device is provided that includes a first display configured to display a primary resource, and a second display electronically coupled to the first display to permit movement of the primary resource from the first display to the second display. The electronic device also includes a processor, and a data storage device having executable instructions accessible by the processor. Responsive to execution of the instructions, the processor shares the first display, including the primary resource, with at least one network based electronic device, and obtains context data related to a user of the at least one network based electronic device. Also responsive to the instructions, the processor selects between the first display and the second display to launch a network responsive resource based on the context data related to the user of the at least one network based electronic device while sharing the first display with the at least one network based electronic device.

Optionally, responsive to execution of the instructions, the processor also identifies the user of the at least one network based electronic device based on the context data. In one example, responsive to execution of the instructions, the processor also obtains content related to the network responsive resource in response to a command to launch the network responsive resource, and selects between the first display and the second display to launch the network responsive resource based on the content. Alternatively, in responsive to execution of the instructions, the processor also determines that the network responsive resource is related to at least one of the primary resource, or the user of the network based electronic device, and selects the first display to launch the network responsive resource. Responsive to execution of the instructions, the processor additionally, automatically launches the network responsive resource on the first display. In another aspect, responsive to execution of the instructions, the processor also determines that the network responsive resource is not related to at least one of primary resource, or the user of the network based electronic device, selects the second display to launch the network responsive resource, and automatically launches the network responsive resource on the second display. In another example, responsive to execution of the instructions, the processor also determines that more context data and content is required to select between the first display and the second display, prompts, on the second display, a user of the electronic device to select the first display or second display for launching the network responsive resource, and launches the network responsive resource on the first display or the second display selected. In one aspect, the content is at least one of webpage address, webpage text, document text, webpage image, or application type.

Optionally, responsive to execution of the instructions, the processor also obtains input from a user of the electronic device that the network responsive resource is not related to any user of the at least one network based electronic device, and automatically launches the network responsive resource on the second display in response to a command to open the network responsive resource. In one example, the first display is a laptop display, and the second display is a monitor electronically coupled to the laptop display. In one aspect, the primary resource is one of a document, webpage, presentation, or application. In another embodiment, the network responsive resource is one of an electronic mail server, webpage, document, or application. In one example, obtaining context data of the user of the network based device includes at least one of searching a calendar on the electronic device, utilizing facial recognition software, utilizing voice recognition software, or receiving a manual input.

In accordance with embodiments herein, a method is provided where under control of one or more processors including program instructions to share the first display with at least one network based electronic device, and obtain context data related to a user of the at least one network based electronic device. The program instructions additionally identify the user of the at least one network based electronic device based on the context data, and select between the first display and a second display to launch network responsive resource based on the user of the at least one network based electronic device while sharing the first display with the at least one network based electronic device.

Optionally, under the control of the one or more processors further including program instructions to obtain content related to the network responsive resource in response to a command to open the network responsive resource, and select between the first display and the second display to launch the network responsive resource based on the content. In one aspect, under the control of the one or more processors further including program instructions to determine that the network responsive resource is related to the at least one of a primary resource shared on the first display, or the user of the network based electronic device, and determine that the network responsive resource is not related to at least one of the primary resource shared on the first display, or the user of the network based electronic device. The program instructions also to automatically launch the network responsive resource on the first display in response to determining the network responsive resource is related to the at least one of the primary resource shared one the first display, or the user of the network based electronic device, and automatically launch the network responsive resource on the second display in response to determining the network responsive resource is not related to the at least one of the primary resource, shared on the first display or the user of the network based electronic device.

Optionally, under the control of the one or more processors further including program instructions to determine that additional context data and additional content is required to select between the first display and the second display, and prompt, on the second display, a user of the electronic device to select the first display or second display for launching the network responsive resource. The program instructions are also provided to launch the network responsive resource on the first display, or the second display selected. In one example, under the control of the one or more processors further including program instructions to obtain input from a user of the electronic device that the network responsive resource is not related to any user of the at least one network based electronic device, and automatically launch the network responsive resource on the second display in response to a command to open the network responsive resource.

In accordance with embodiments herein, a computer program product is provided that includes a non-signal computer readable storage medium comprising computer executable code to launch a network responsive resource on a first display or a second display during screen sharing where a primary resource is displayed on a first display. The computer program product automatically obtains context data related to a user of at least one network based electronic device, and identifies the user of the at least one network based electronic device based on the context data. The computer program product also determines that the network responsive resource is related to at least one of the primary resource, or the user of the network based electronic device, and determines that the network responsive resource is not related to at least one of the primary resource, or the user of the network based electronic device. The computer program product also automatically launches the network responsive resource on the first display in response to determining the network responsive resource is related to the at least one primary resource, or the user of the network based electronic device while sharing the first display with the at least one network based electronic device, and automatically launches the network responsive resource on the second display in response to determining the network responsive resource is not related to the at least one primary resource, or the user of the network based electronic device while sharing the first display with the at least one network based electronic device.

Optionally, the computer executable code also determines that more context data and content is required to select between the first display and the second display, prompts, on the second display, a user of the electronic device to select the first display or second display for launching the network responsive resource, and launches the network responsive resource on the first display or the second display selected. In one aspect the computer executable code also obtains input from a user of the electronic device that the network responsive resource is not related to any user of the at least one network based electronic device, and automatically launches the network responsive resource on the second display in response to a command to open the network responsive resource.

DETAILED DESCRIPTION

Figure 1:
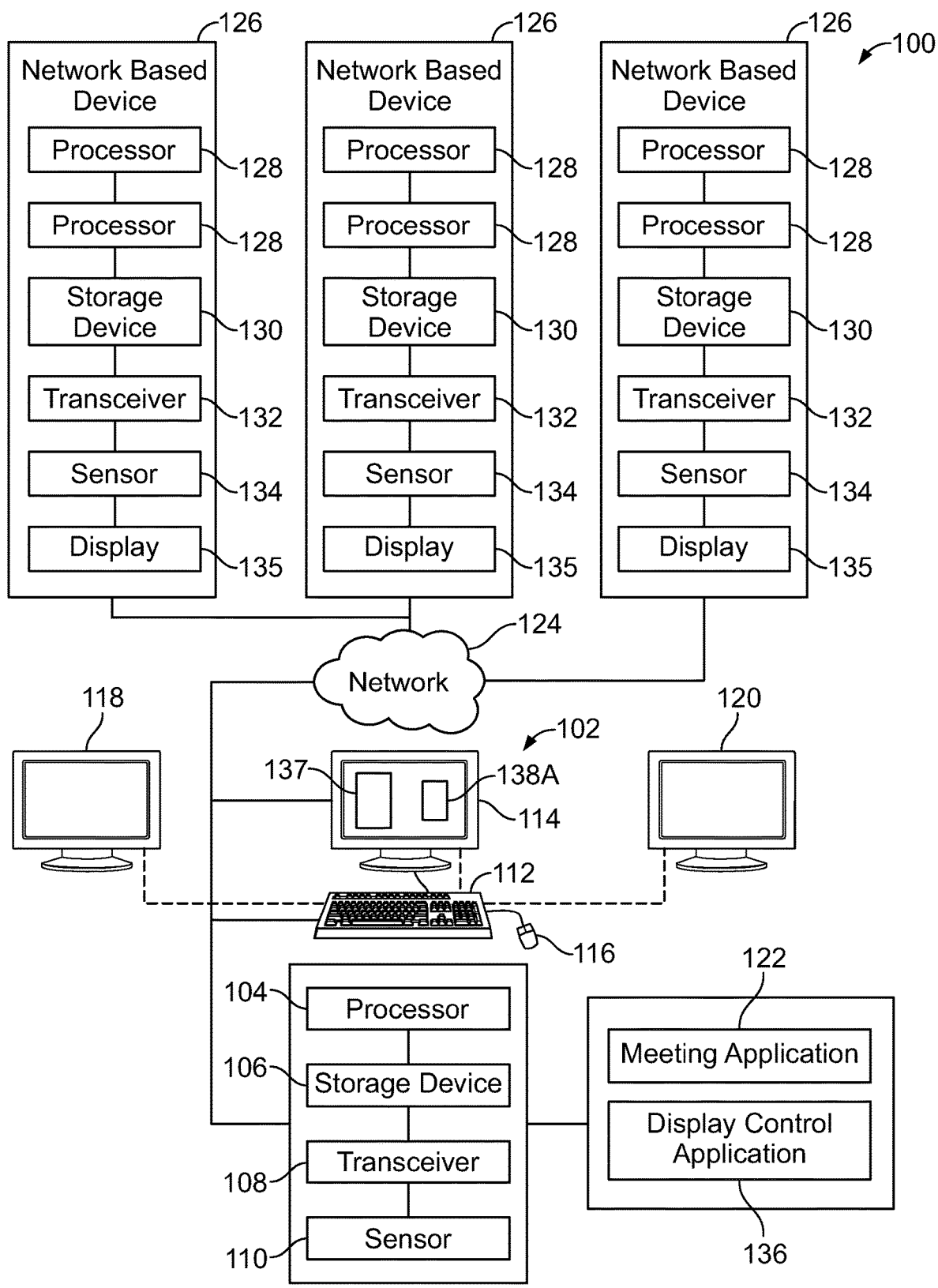
FIG. 1 illustrates a system for launching a network responsive resource on a display during screen sharing in accordance with embodiments herein.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

The term "resource" refers to any non-network retrievable or network retrievable structure that has identity and is returned by a resource manager in response to a request. Non-limiting examples include a file or document, presentation, webpage on the World Wide Web, a local area network, or a wide area network, or the like. The documents, or presentations may include words, phrases, text, images, graphics, etc. that are considered content. The webpage may include an HTML and/or scripts, words, phrases, text, images, graphics, etc. that are also considered content. The webpage is often hyperlinked to other documents on the Web/network. A network responsive resource includes network retrievable structure that has identify and is returned by a resource manage in response to a request. Network retrievable content can remain constant or change over time. As an example, a network responsive resource can be dynamic. Network responsive resources may be characterized as abstract responsive resources or information responsive resources. URLs, particularly HTTP URIs, are frequently used to identify abstract resources, such as classes, properties or other kind of concepts. Examples can be found in RDFS or OWL ontologies. URLs are also used to identify information resources.

The term "content" refers to entities within a document, webpage, platform, application, presentation, etc. forming a network responsive resource. Content may include images, services (e.g., "National Weather Service"), text, video, audio, scripts, a combination thereof and/or links to other resources. The content is rendered (e.g., assembled) by a browser of a client device for viewing by the user. For example, the content may include static, finalized content, such as text, images, etc. that are directly rendered and displayed by the browser. The content may also include linking components that include a link or address of other content. Content may also represent script based components, for which one or more scripts are to be executed before a browser can render and display an executed script (e.g., graphics, text, images, video, audio and the like). Content may also represent auto activated components that begin to play automatically when opened in a browser. Content can also include webpage addresses, webpage text, document text, webpage image, application type, etc.

The term "context data" refers to any and all content and other data and information related to a user or resource that can be utilized to identify the user or subject matter associated with the resource. Context data, in addition to content, can include images, voice recognition data, data within a storage device, location data, sensor obtained data, data input by a user, or the like.

The term "URL" shall mean a uniform resource locator which is an address of a specific webpage, file or other resource available on a computing device, computer network (e.g., the Internet) or other memory. A URL represents an example of one type of full path designator.

The term "browser" refers to an application program that provides a graphical user interface to interact with a network resource manager, such as a server operated in connection with the World Wide Web, a local area network, or a wide area network. The application program is designed to display and/or present audio/video content, based on files or documents received from the network resource manager. The application program may operate on various types of electronic devices, including but not limited to laptop computers, desktop computers, tablet devices, smart phones and the like. Nonlimiting examples of browsers include web browsers that operate as an application program that uses the hypertext transfer protocol (HTTP) to make request of Web servers throughout the Internet on behalf of the user of the browser. Examples of web browsers include Mosaic, Internet Explorer, Firefox, Flock, Safari, Lynx, Chrome and Opera browsers. The term browser also includes social media application programs, such as applications for Facebook, Instagram, Twitter, YouTube, newspapers, etc.

The term "obtains" and "obtaining", as used in connection with data, signals, information and the like, include at least one of i) accessing memory of an external device or remote server where the data, signals, information, etc. are stored, ii) receiving the data, signals, information, etc. over a wireless communications link between the base device and a secondary device, and/or iii) receiving the data, signals, information, etc. at a remote server over a network connection. The obtaining operation, when from the perspective of a base device, may include sensing new signals in real time, and/or accessing memory to read stored data, signals, information, etc. from memory within the base device. The obtaining operation, when from the perspective of a secondary device, includes receiving the data, signals, information, etc. at a transceiver of the secondary device where the data, signals, information, etc. are transmitted from a base device and/or a remote server. The obtaining operation may be from the perspective of a remote server, such as when receiving the data, signals, information, etc. at a network interface from a local external device and/or directly from a base device. The remote server may also obtain the data, signals, information, etc. from local memory and/or from other memory, such as within a cloud storage environment and/or from the memory of a personal computer.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

A system and processes are provided for controlling content shared with audience members when in a virtual meeting. When a user of a primary electronic device shares a first display during the meeting, the system reviews any time the user attempts to launch a new network responsive resource (e.g. webpage, document, email account, presentation, etc.) to prevent an inadvertent launch onto the shared display. The system obtains context data, including from the content of materials displayed of the first display, and from the secondary electronic devices being utilized by individual audience members. Based on the context data and content, the system determines if the new network responsive resource should be launched on the first display, or a different display not available for viewing by the audience. If the system is unable to determine the appropriate display to launch the network responsive resource, the user is prompted on a display not shared with the audience to indicate the display on which to launch the network responsive resource.

FIG. 1 provides an illustration of a system 100 including a primary electronic device 102. The primary electronic device 102 can be a laptop, CPU, etc. The primary electronic device 102 includes one or more processors 104, a storage device 106, or memory, and a transceiver 108. The transceiver 108 in one embodiment may be a separate receiver and transmitter, while alternatively the transceiver may be a single component. The primary electronic device 102 may optionally include and one or more sensors 110 for detecting context data. The one or more sensors can include a camera, microphone, image scanner, etc. Each of the one or more sensors may detect images, sounds, etc. that can be utilized in association with image recognition software to identify images of individuals at a primary electronic deice 102, and voice recognition software to identify individuals talking through an electronic device 102.

The primary electronic device 102 may include an input device 112 along with a first display 114. The input device 112 in one example is a keyboard including keys that may provide inputs that vary documents, platforms, etc. on the first display. The primary electronic device 102 may also include a secondary input device 116 that in one example is a mouse. The secondary input device 116 may be electrically coupled to the input device 112 through a wire such as a chord (e.g. USB chord), or may be wirelessly coupled. Alternatively, the secondary input device may be a touch pad on the input device 112. In one example, the first display 114 is hingedly coupled to the input device, such as when the primary electronic device 102 is a laptop computer. The first display may optionally be detachable from the input device 112. In another embodiment, the first display 114 is separate from the input device 112. In such an embodiment, the input device 112 and first display 114 may be electrically coupled via a wire or chord (e.g. USB chord), or wirelessly.

The primary electronic device 102 may include a second display 118 and a third display 120 that are electrically coupled to the input device 112, secondary input device 116, first display 114, and/or one another. While a second display 118 and third display 120 are illustrated, in other examples, only a second display 118 is provided. In other examples, more than three displays are provided. In one example, the first display is a laptop display while the second display and third display are both monitors electrically coupled to the laptop display. Specifically, the displays 114, 118, 120 are electrically coupled to one another such that any document, application, icon, presentation, etc. on one display can be moved from one display to another as though they are all one display. As an example, the second display 118 can be placed to the left of the first display 114, and the third display 120 can be placed to the right of the first display. In such an example, a document appearing on the first display can be moved utilizing the secondary input device 116 to the left to the second display 118, or to the right to the third display 120. To this end, the input device 112 can provide inputs to any of the displays 114, 118, or 120, and applications such as websites, can be launched on any of the displays 114, 118, or 120 when the displays are electrically coupled.

The primary electronic device 102 may include one or more meeting applications 122 that operate with a network 124 to provide virtual meetings. The meeting application 122 in examples can be Zoom, Webex, gotoMeeting, Google Meets, etc. Each application may be a computer program product comprising a non-signal computer readable storage medium that includes computer executable code to receive a list of email addresses. The application may send an email to each of the email addresses that includes at least one of a call in number, link to a webpage, contact information, passcode, meeting number, or the like. The email may also include the time of the meeting, and upload the meeting time and accompanying information on a recipient's calendar. The meeting application 122 also sets up meeting space such that everyone that logs onto the link or calls the call in number can communicate with one another. The meeting application 122 may also include muting options, video feed options, text chat options, and screen sharing.

The primary electronic device 102 communicates through the network 124 to provide the emails, invites, passcodes, etc. to the different email addresses at a plurality of network based electronic devices 126. In one example, the network based electronic devices 126 are remote electronic devices at a different location than the primary electronic device 102. The communication through the network 124 between the primary electronic device 102 and network based electronic devices 126 in example embodiments include over a wire, through one or more wireless protocols including Bluetooth, GSM, infrared wireless LAN, HIPERLAN, 4G, 5G, satellite, or the like.

Each of the plurality of network based electronic devices 126 includes one or more processors 128, a storage device 130 such as a memory, and a transceiver 132 for receiving communication. The network based electronic devices 126 may optionally include one or more sensors 134 such a camera, microphone, or the like to collect context data that may be communicated to the primary electronic device 102. The network based electronic devices 126 may each also have a display 135. The network based electronic devices 126 may include smart phones, smart watches, smart TVs, tablet devices, personal digital assistants (PDAs), or the like.

The primary electronic device 102 also includes a display control application 136 that is configured to determine which display 114, 118, 120 to launch primary resources 137 and network responsive resources 138A, 138B, 138C such as a document, presentation, application, webpage, etc. while the meeting application 124 is in operation. The display control application 136 in one example is a computer program product comprising a non-signal computer readable storage medium comprising computer executable code to launch the network responsive resources 138A, 138B, 138C on a first display 114, a second display 118, or third display 120 during screen sharing when a primary resource 137 is displayed on a first display.

Upon activation of the meeting application 124, if a user of the primary electronic device 102 desires to share the contents on the first display 114, the user of the primary electronic device 102 starts the screen sharing application/functionality. Upon starting the screen sharing application/functionality, the display control application 136 activates. During screen sharing, the contents of the first display 114 selected by the user is shared, and seen by users of network based electronic devices 126. Therefore, if a primary resource 137 is a presentation that is on the first display 114, the users of the network based electronic devices, or audience members, can see the primary resource 137. To this end, as the user of the primary electronic device 102 makes changes on the first display 114, such as selecting a new slide of a presentation, the change occurs on the displays 135 of the network based electronic devices 126.

In one example, during a screen sharing session the user of the primary electronic device 102 is providing a primary resource 137 that is a presentation regarding a decision on whether to attend an electronics trade show in New York. During the presentation, the user of the primary electronic device 102 receives a question from the audience regarding competitors that will be attending. As a result, the user of the primary electronics device 102 decides to launch a network responsive resource 138A that is the electronics trade show webpage to find attendees. The display control application 136 obtains content related to both the primary resource 137 that is the presentation, along with content related to the network responsive resource 138A that has been commanded to launch. For example, the display control application 136 compares terms in the presentation such as "New York", "trade show", "electronics trade show", etc. to terms on the webpage that also includes the terms "New York", "trade show", and "electronics trade show" to determine if the first network responsive resource 138A is related to the presentation and should be launched on the first display 114. Alternatively, the presentation may include the webpage address, again indicating the first network responsive resource 138 should be launched on the first display 114. To determine the first display 114 should be the launching display, a word comparison can thus be made. Alternatively, words associated with the content in the presentation and webpage may be determined and compared for matches. In yet another example an algorithm, mathematical function, model, etc. may be utilized to determine if the first network responsive resource 138A is related to the primary resource 137.

Figure 2:
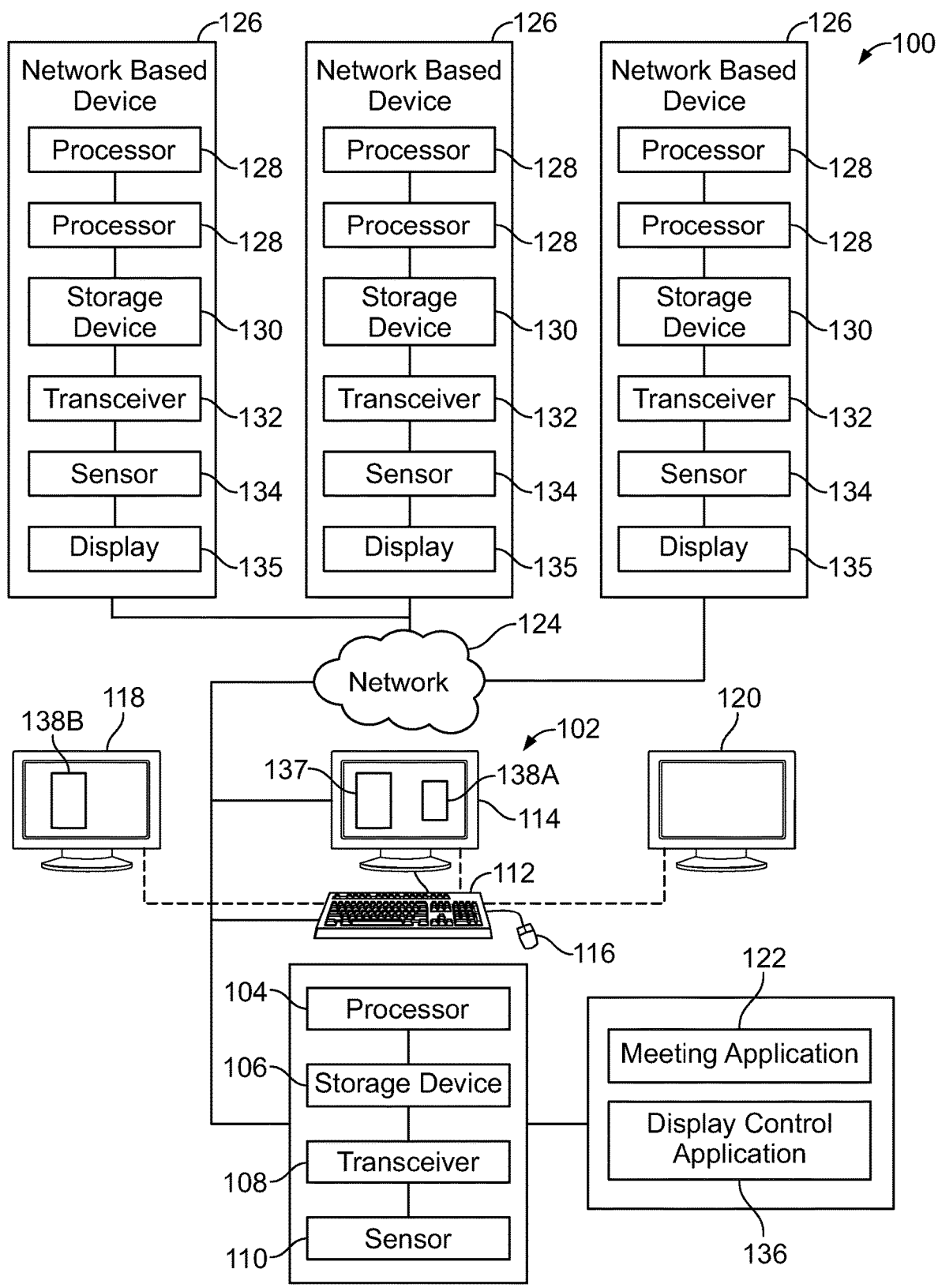
FIG. 2 illustrates a system for launching a network responsive resource on a display during screen sharing in accordance with embodiments herein.

With reference to FIG. 2 in another example, at the end of the presentation the user of the primary electronic device 102 neglects to stop sharing their display. While the audience is at the meeting, the user's boss decides to take ten minutes to remind everyone that coversheets need to be added to TPS reports as a result of a coworker in the meeting, Peter, forgetting to add the coversheet. As a result of being bored, the user decides to launch a second network responsive resource 138B, the webpage amazon.com to see if his favorite Swingline stapler is on sale. The display control application 136 obtains context data related to the second network responsive resource 138B and users of the network based electronic devices 126. In one example, the context data is a manual input provided by the user of the primary electronic device 102 before the meeting that the webpage amazon.com (along with numerous other webpages such as espn.com, cnn.com, msnbc.com, foxnews.com, facebook.com, etc.) is automatically determined to be not related to any primary resource or user of network based electronic devices. Alternatively, such context data may include voice identification of the user's boss, calendar information of the user, the email addresses of the participates, etc. At the same time, content related to the second network responsive resource 138B is obtained, including the website name, items on sale, and staplers. A determination is made that the second network responsive resource 138B is not related to the users of the network based electronic devices 126, or the primary resource. Consequently, the second network responsive resource 138B launches on the second display 118, preventing the user's boss and others from seeing that the user of the primary electronic device 102 is shopping and not paying attention.

Figure 3:
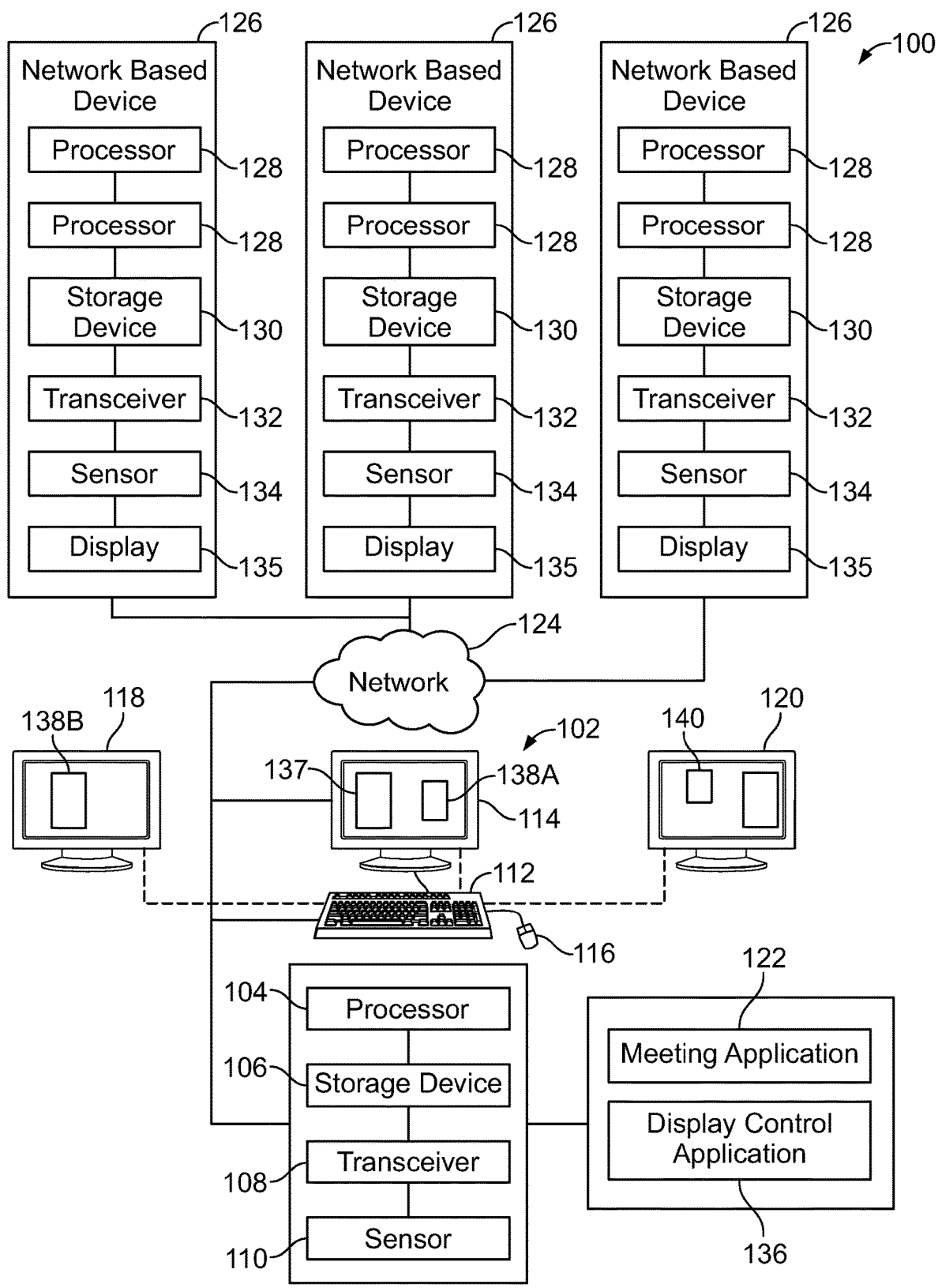
FIG. 3 illustrates a system for launching a network responsive resource on a display during screen sharing in accordance with embodiments herein.
Figure 4:
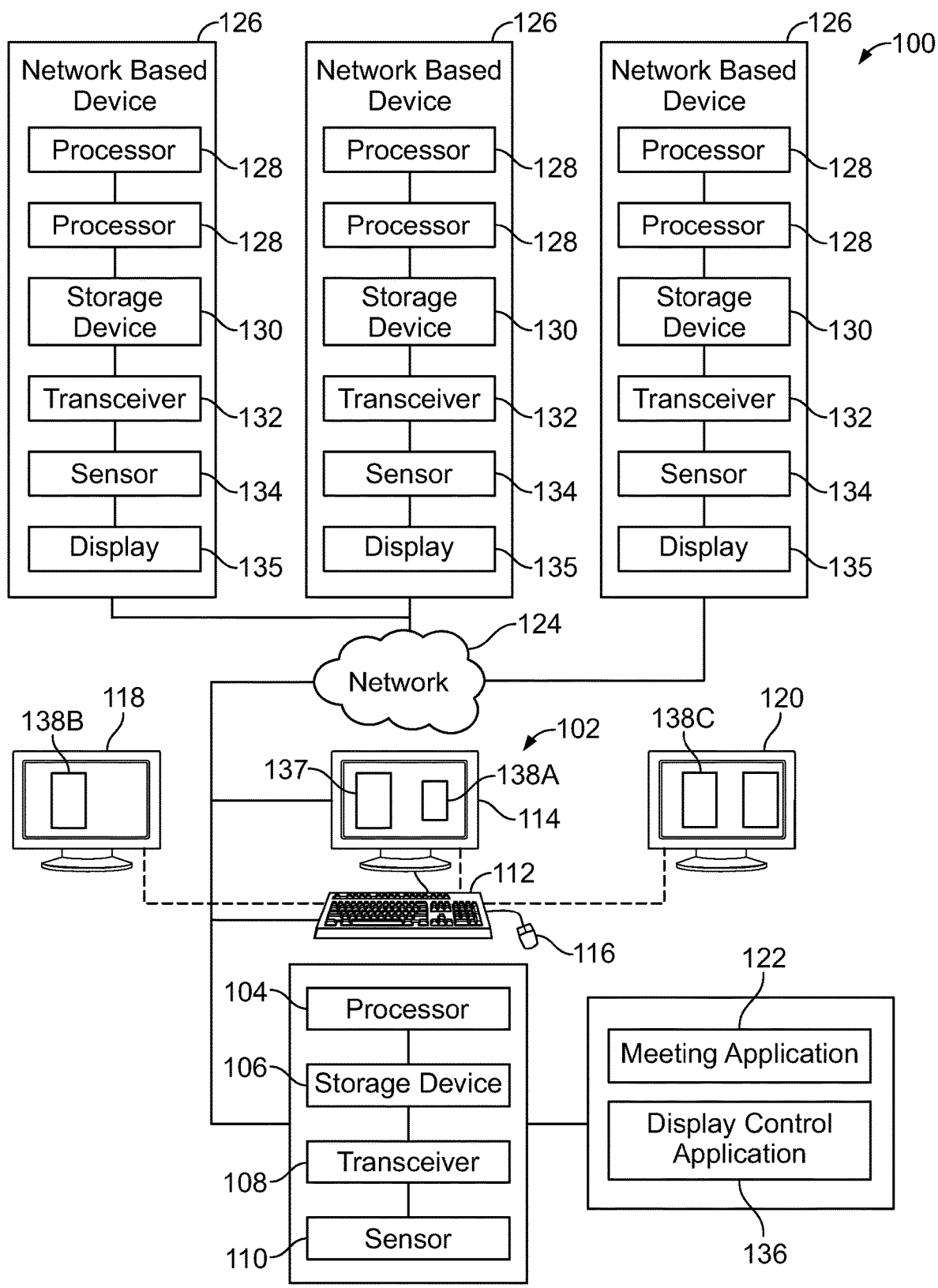
FIG. 4 illustrates a system for launching a network responsive resource on a display during screen sharing in accordance with embodiments herein.

With reference to FIGS. 3 and 4, in another example, after the user of the primary electronic device 102 finishes shopping for staplers, and his boss is still discussing the cover letter on the TPS reports, the user of the primary electronic device 102 decides to check a calendar in his email application to determine if he has any other meetings during the day. Therefore, the user of the primary electronic device 102 decides to launch a third responsive resource 138C that is his email application. Again, the display control application 136 obtains context data about the audience, and context data related to the electronic mail application. Such context data related to the email application is whether the email application is a personal email application or a work email application. If a work email application, but no additional context data can be obtained regarding whether the email application is being launched because it is related to the user's of the network based electronic devices 126 or the primary resource, a prompt box 140 may be launched on either the second display 118 or third display 120. The prompt box 140 prompts the user to manually input the display on which the user desires the email application to launch. Upon the selection of the display, the email application launches on the selected display. By providing an option to the user, if there is an email pertinent to the meeting that is desired to be shown the audience, the user can do so without having to drag the email application from another display. However, if the user does not want the audience to see that the user is accessing their email application, the user can have it launched on a display the audience cannot see.

Figure 5:
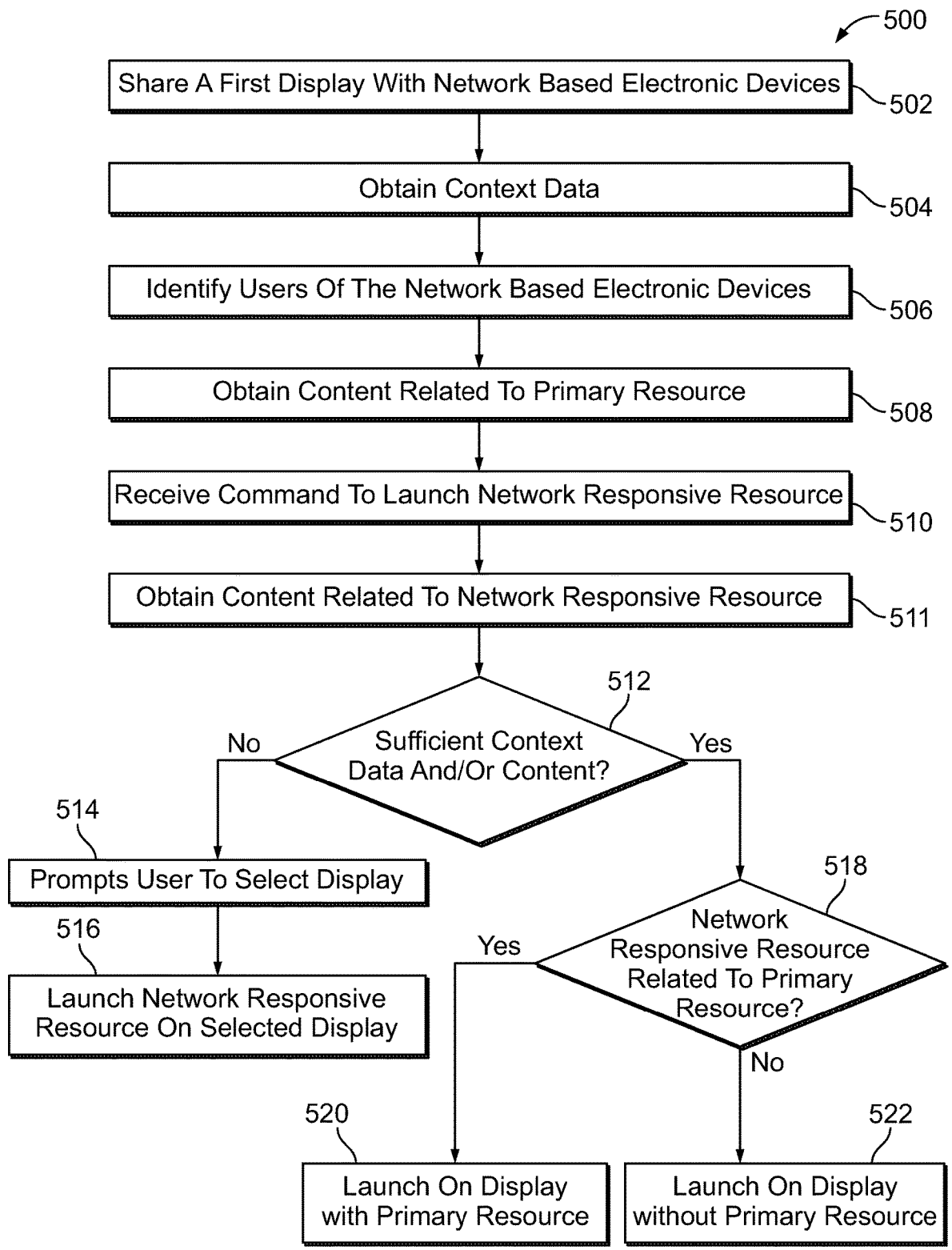
FIG. 5 illustrates a process for launching a network responsive resource on a display during screen sharing in accordance with embodiments herein.

FIG. 5 illustrates a process 500 for controlling content when in a virtual meeting. In one example the system of FIGS. 1-4 is utilized to implement the process.

At 502, one or more processors share a first display with at least one network based electronic device. In one example the first display is part of a primary electronic device. The first display may be shared using a meeting application that connects the primary electronic device with one or more network based electronic devices. In one example the network based electronic devices are remote to the primary electronic device. In particular, the network based electronic devices may be computing devices within the home of individuals that make up the audience for a meeting that the user of the primary electronic device is hosting.

At 504, the one or more processors obtain context data related to a user of the at least one network based electronic device. The context data may be obtained from the invite email, image data, microphone data, calendar data, etc. The context data provides context to who the individual is that is participating in a meeting. The context data is provided to distinguish between having a meeting with a boss, supervisor, client, potential client, etc. in the meeting compared to a family member, friend, or non-work acquaintance. Based on the individuals in the audience, results in different determinations regarding content presented on the display of the primary electronic device.

At 506, the one or more processors identifies users of the at least one network based electronic device based on the context data. The one or more processors utilize any context data that is obtained to identify the user of the at least one network. Typically, invite emails are sent to email addresses of known individuals, such as supervisors, bosses, colleagues, clients, potential clients, family members, friends, or the like. Even when the invitation is not directed to an email address that is known, or when an individual who is sharing their display was not the original individual who set up a meeting, other methods may be utilized to determine the identity of the user of the network based electronic device. An invitation email received, image data, voice recognition data, or the like may be utilized to identify one or more users of the network based devices.

At 508, the one or more processors obtain content related to a primary resource. In particular, even if the one or more processors determine one or more users of the network based devices, or the one or more processors are unable to determine one or more users of the network based devices, the one or more processors still obtain content related to the primary resource. The primary resource is a document, presentation, webpage, etc. that is presented on a primary electronic device during a meeting for the users of the network based electronic devices. In one embodiment, the primary resource may be a word document that is being reviewed by the individuals in the meeting. A text analyzer may be utilized to determine the content in the word document. Similarly the primary resource may be a webpage where a text analyzer, parsing, image analyzer, etc. may be utilized to obtain the content. In yet another example, a PowerPoint presentation may be the primary resource where again a text analyzer, image analyzer, etc. may be utilized to determine content.

At 510, the one or more processors receive a command to launch a network responsive resource. In one example, the user of the primary electronic device activates an icon to launch a webpage, email server, word document, application, presentation, etc. By activating the icon, the command is sent to the one or more processors to launch the network responsive resource.

At 511, the one or more processors obtain content related to the network responsive resource in response to the command to open the network responsive resource. The content related to the network responsive resource may be a web address, a URL, word, or phrase on a webpage, in a document, presentation, etc. The content may be obtained through text recognition, image recognition, parsing, or the like.

At 512, the one or more processors determine if sufficient context data and/or content has been obtained to determine if the network responsive resource is related to the primary resource or not related to the primary resource. If a determination is made that insufficient context data and content has been obtained, then at 514, the one or more processors prompts the user of the primary electronic device, on a display that is not the display with the primary resource, to select the display for displaying the network responsive resource. At 516, the one or more processors launch the network responsive resource on the display selected by the user. The display can be the display on which the primary resource is presented, or be on a display on which the primary resource is not presented. In this manner, if the user does not desire the network responsive resource to be seen by the users of network based electronic devices, an inadvertent launch to the incorrect display is avoided.

If at 512, the one or more processors determine sufficient context data and/or content has been obtained, at 518, the one or more processors determine if the network responsive resource is related to the primary resource. In one example, the determination is made by matching words between the content of the primary resource and content of the network responsive resource. In another example, the determination is made by comparing a determined user of a network based electronic device and the content of the network responsive resource. In one such example, the user selects numerous webpages, word documents, presentations, etc. that are not related to a particular identified user. In one example, the user is an attorney and the user of the network based electronic device is a first client, and the selected documents that are not related to the client are documents related to other clients. In this manner, an inadvertent click or activation of an incorrect document to show the first client does not result in confidential information of another client being shared and breaking confidentiality. Such a scenario could additionally be possible with individuals working with confidential financial documents where such an inadvertent disclosure could lead to an individual having to report the disclosure to a government agency. In this manner, the method prevents such problematic scenarios.

If at 518, the network responsive resource is determined to be related to the primary resource, then at 520, the network responsive resource is displayed on a selected display with the primary resource. In this manner, when a network responsive resource is meant to be shared with audience members during a meeting, the one or more processors automatically launch the network responsive resource on the selected display with the primary resource to allow such sharing. This prevents the network responsive resource from being displayed on an incorrect display causing the network responsive resource not to appear to the audience, and causing the network responsive resource to be dragged from another display to the display with the primary resource. Such dragging wastes time and focus of audience member. When the audience member is a potential client, small details such as this can be the difference between a potential client believing you are professional, or unprofessional.

If at 518, the network responsive resource is determined to not be related to the primary resource, then at 522, the network responsive resource is displayed on a selected display that does not include the primary resource. In this manner, the audience does not see the network responsive resource. So, if the network responsive resource is confidential, an inadvertent disclosure may be avoided. Alternatively, if the network responsive resource is a non-work related webpage, potential embarrassment or annoyance can be avoided. Consequently, depending on whether the network responsive resource is related or not related to the primary resource, or a user of a network based electronic device, the one or more processors select between the first display and a second display to automatically launch the network responsive resource while the user is sharing a display with the at least one network based electronic device.

As will be appreciated, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable data storage device(s) having computer (device) readable program code embodied thereon.

Any combination of one or more non-signal computer (device) readable mediums may be utilized. The non-signal medium may be a data storage device. The data storage device may be, for example, an electronic, magnetic, optical, electromagnetic, infrared, or semiconductor system, apparatus, or device, or any suitable combination of the foregoing. More specific examples of a data storage device may include a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface and a storage device for storing code may store the program code for carrying out the operations and provide this code through the network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable data storage device, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An electronic device comprising:
   a first display configured to display a primary resource;
   a second display electronically coupled to the first display to permit movement of the primary resource from the first display to the second display;
   a processor;
   a data storage device having executable instructions accessible by the processor;
   wherein, responsive to execution of the instructions, the processor:
   shares the first display, including the primary resource, with at least one network based electronic device;
   obtains context data related to a user of the at least one network based electronic device;
   selects between the first display and the second display to launch a network responsive resource based on the context data related to the user of the at least one network based electronic device while sharing the first display with the at least one network based electronic device;
   obtains content related to the network responsive resource in response to a command to launch the network responsive resource;
   selects between the first display and the second display to launch the network responsive resource based on the content;
   determines that the network responsive resource is related to at least one of the primary resource, or the user of the network based electronic device;
   selects the first display to launch the network responsive resource; and
   automatically launches the network responsive resource on the first display.

2. The electronic device of claim 1, wherein, responsive to execution of the instructions, the processor further: identifies the user of the at least one network based electronic device based on the context data.

3. An electronic device comprising:
   a first display configured to display a primary resource;
   a second display electronically coupled to the first display to permit movement of the primary resource from the first display to the second display;
   a processor;
   a data storage device having executable instructions accessible by the processor;
   wherein, responsive to execution of the instructions, the processor:
   shares the first display, including the primary resource, with at least one network based electronic device;
   obtains context data related to a user of the at least one network based electronic device;
   selects between the first display and the second display to launch a network responsive resource based on the context data related to the user of the at least one network based electronic device while sharing the first display with the at least one network based electronic device;
   obtains content related to the network responsive resource in response to a command to launch the network responsive resource;
   selects between the first display and the second display to launch the network responsive resource based on the content;
   determines that the network responsive resource is not related to at least one of primary resource, or the user of the network based electronic device;
   selects the second display to launch the network responsive resource; and
   automatically launches the network responsive resource on the second display.

4. An electronic device comprising:
   a first display configured to display a primary resource;
   a second display electronically coupled to the first display to permit movement of the primary resource from the first display to the second display;
   a processor;
   a data storage device having executable instructions accessible by the processor;
   wherein, responsive to execution of the instructions, the processor:
   shares the first display, including the primary resource, with at least one network based electronic device;
   obtains context data related to a user of the at least one network based electronic device;
   selects between the first display and the second display to launch a network responsive resource based on the context data related to the user of the at least one network based electronic device while sharing the first display with the at least one network based electronic device;
   obtains content related to the network responsive resource in response to a command to launch the network responsive resource;
   selects between the first display and the second display to launch the network responsive resource based on the content;
   determines that more context data and content is required to select between the first display and the second display;
   prompts, on the second display, a user of the electronic device to select the first display or second display for launching the network responsive resource; and
   launches the network responsive resource on the first display or the second display selected.

5. The electronic device of claim 4, wherein the content is at least one of webpage address, webpage text, document text, webpage image, or application type.

6. An electronic device comprising:
   a first display configured to display a primary resource;
   a second display electronically coupled to the first display to permit movement of the primary resource from the first display to the second display;
   a processor;
   a data storage device having executable instructions accessible by the processor;
   wherein, responsive to execution of the instructions, the processor:
   shares the first display, including the primary resource, with at least one network based electronic device;

obtains context data related to a user of the at least one network based electronic device;

selects between the first display and the second display to launch a network responsive resource based on the context data related to the user of the at least one network based electronic device while sharing the first display with the at least one network based electronic device;

obtains input from a user of the electronic device that the network responsive resource is not related to any user of the at least one network based electronic device; and automatically launches the network responsive resource on the second display in response to a command to open the network responsive resource.

7. The electronic device of claim 1, wherein the first display is a laptop display, and the second display is a monitor electronically coupled to the laptop display.

8. The electronic device of claim 1, wherein the primary resource is one of a document, webpage, presentation, or application.

9. The electronic device of claim 1, wherein the network responsive resource is one of an electronic mail server, webpage, document, or application.

10. The electronic device of claim 1, wherein obtaining context data of the user of the network based device comprises at least one of searching a calendar on the electronic device, utilizing facial recognition software, utilizing voice recognition software, or receiving a manual input.

11. A method, comprising:
under control of one or more processors including program instructions to:
share the first display with at least one network based electronic device;
obtain context data related to a user of the at least one network based electronic device;
identifies the user of the at least one network based electronic device based on the context data;
select between the first display and a second display to launch network responsive resource based on the user of the at least one network based electronic device while sharing the first display with the at least one network based electronic device;
obtain content related to the network responsive resource in response to a command to open the network responsive resource;
select between the first display and the second display to launch the network responsive resource based on the content;
determine that the network responsive resource is related to the at least one of a primary resource shared on the first display, or the user of the network based electronic device;
determine that the network responsive resource is not related to at least one of the primary resource shared on the first display, or the user of the network based electronic device;
automatically launch the network responsive resource on the first display in response to determining the network responsive resource is related to the at least one of the primary resource shared one the first display, or the user of the network based electronic device; and
automatically launch the network responsive resource on the second display in response to determining the network responsive resource is not related to the at least one of the primary resource, shared on the first display or the user of the network based electronic device.

12. A method, comprising:
under control of one or more processors including program instructions to:
share the first display with at least one network based electronic device;
obtain context data related to a user of the at least one network based electronic device;
identifies the user of the at least one network based electronic device based on the context data;
select between the first display and a second display to launch network responsive resource based on the user of the at least one network based electronic device while sharing the first display with the at least one network based electronic device;
obtain content related to the network responsive resource in response to a command to open the network responsive resource;
select between the first display and the second display to launch the network responsive resource based on the content;
determine that additional context data and additional content is required to select between the first display and the second display;
prompt, on the second display, a user of the electronic device to select the first display or second display for launching the network responsive resource; and
launch the network responsive resource on the first display or the second display selected.

13. A method, comprising:
under control of one or more processors including program instructions to:
share the first display with at least one network based electronic device;
obtain context data related to a user of the at least one network based electronic device;
identifies the user of the at least one network based electronic device based on the context data;
select between the first display and a second display to launch network responsive resource based on the user of the at least one network based electronic device while sharing the first display with the at least one network based electronic device;
obtain input from a user of the electronic device that the network responsive resource is not related to any user of the at least one network based electronic device; and
automatically launch the network responsive resource on the second display in response to a command to open the network responsive resource.

14. A computer program product comprising a non-signal computer readable storage medium comprising computer executable code to: launch a network responsive resource on a first display or a second display during screen sharing where a primary resource is displayed on a first display by automatically:
obtaining context data related to a user of at least one network based electronic device;
identifying the user of the at least one network based electronic device based on the context data;
determining that the network responsive resource is related to at least one of the primary resource, or the user of the network based electronic device;
determining that the network responsive resource is not related to at least one of the primary resource, or the user of the network based electronic device;
automatically launching the network responsive resource on the first display in response to determining the network responsive resource is related to the at least one primary resource, or the user of the network based electronic device while sharing the first display with the at least one network based electronic device; and automatically launching the network responsive resource on the second display in response to determining the network responsive resource is not related to the at least one primary resource, or the user of the network based electronic device while sharing the first display with the at least one network based electronic device.

15. The computer program product of claim 14, the computer executable code to:

determine that more context data and content is required to select between the first display and the second display;

prompt, on the second display, a user of the electronic device to select the first display or second display for launching the network responsive resource; and launch the network responsive resource on the first display or the second display selected.

16. The computer program product of claim 14, the computer executable code to:

obtain input from a user of the electronic device that the network responsive resource is not related to any user of the at least one network based electronic device; and automatically launch the network responsive resource on the second display in response to a command to open the network responsive resource.

17. The electronic device of claim 1, wherein the content is at least one of webpage address, webpage text, document text, webpage image, or application type.

18. The electronic device of claim 3, wherein the first display is a laptop display, and the second display is a monitor electronically coupled to the laptop display.

19. The electronic device of claim 4, wherein the first display is a laptop display, and the second display is a monitor electronically coupled to the laptop display.

20. The electronic device of claim 6, wherein the first display is a laptop display, and the second display is a monitor electronically coupled to the laptop display.

\* \* \* \* \*